(12) United States Patent
Thomas

(10) Patent No.: US 7,603,860 B2
(45) Date of Patent: Oct. 20, 2009

(54) HIGH EFFICIENCY FLEXFUEL INTERNAL COMBUSTION ENGINE

(76) Inventor: Mark Odell Thomas, 9 Perry Cir. Apt F, Annapolis, MD (US) 21402

( * ) Notice: Subject to any disclaimer, the term of this patent is extended or adjusted under 35 U.S.C. 154(b) by 567 days.

(21) Appl. No.: 11/309,510

(22) Filed: Aug. 15, 2006

(65) Prior Publication Data

US 2008/0041057 A1 Feb. 21, 2008

(51) Int. Cl.
*F01K 25/02* (2006.01)
(52) U.S. Cl. .......................... 60/650; 60/683
(58) Field of Classification Search .............. 60/39.183, 60/39.511, 645, 650, 682, 683
See application file for complete search history.

(56) References Cited

U.S. PATENT DOCUMENTS

| | | | | |
|---|---|---|---|---|
| 3,879,945 A | * | 4/1975 | Summers ...................... | 60/522 |
| 4,424,667 A | | 1/1984 | Fanning ...................... | 60/39.181 |
| 4,426,842 A | | 1/1984 | Collet ...................... | 60/39.511 |
| 4,475,343 A | * | 10/1984 | Dibelius et al. ............... | 60/648 |
| 4,660,511 A | | 4/1987 | Anderson ...................... | 122/420 |
| 5,095,707 A | | 3/1992 | Eck ...................... | 60/650 |
| 5,272,878 A | | 12/1993 | Schlichtig ...................... | 60/655 |
| 5,537,823 A | | 7/1996 | Vogel ...................... | 60/682 |

* cited by examiner

*Primary Examiner*—Louis J Casaregola
(74) *Attorney, Agent, or Firm*—Louis Ventre, Jr.

(57) ABSTRACT

A heat engine includes a turbine (10), compressor (20), heat pump (30) and combustion source (40) and uses heated and compressed air as a motive fluid in an open Brayton cycle. In the process of the invention, the compressor pressurizes air (21) from the environment. A closed-cycle heat pump (30), having a high-temperature condensation side (33) and a low-temperature evaporation side (35), increases the energy in the compressed air through heat exchange with the high-temperature condensation side (33) of the heat pump. Upon heating in a constant pressure process, the motive fluid is expanded through the turbine (10). The combustion source (40), which is isolated from the motive fluid, further heats the low-temperature evaporation side (35) of the heat pump.

13 Claims, 1 Drawing Sheet

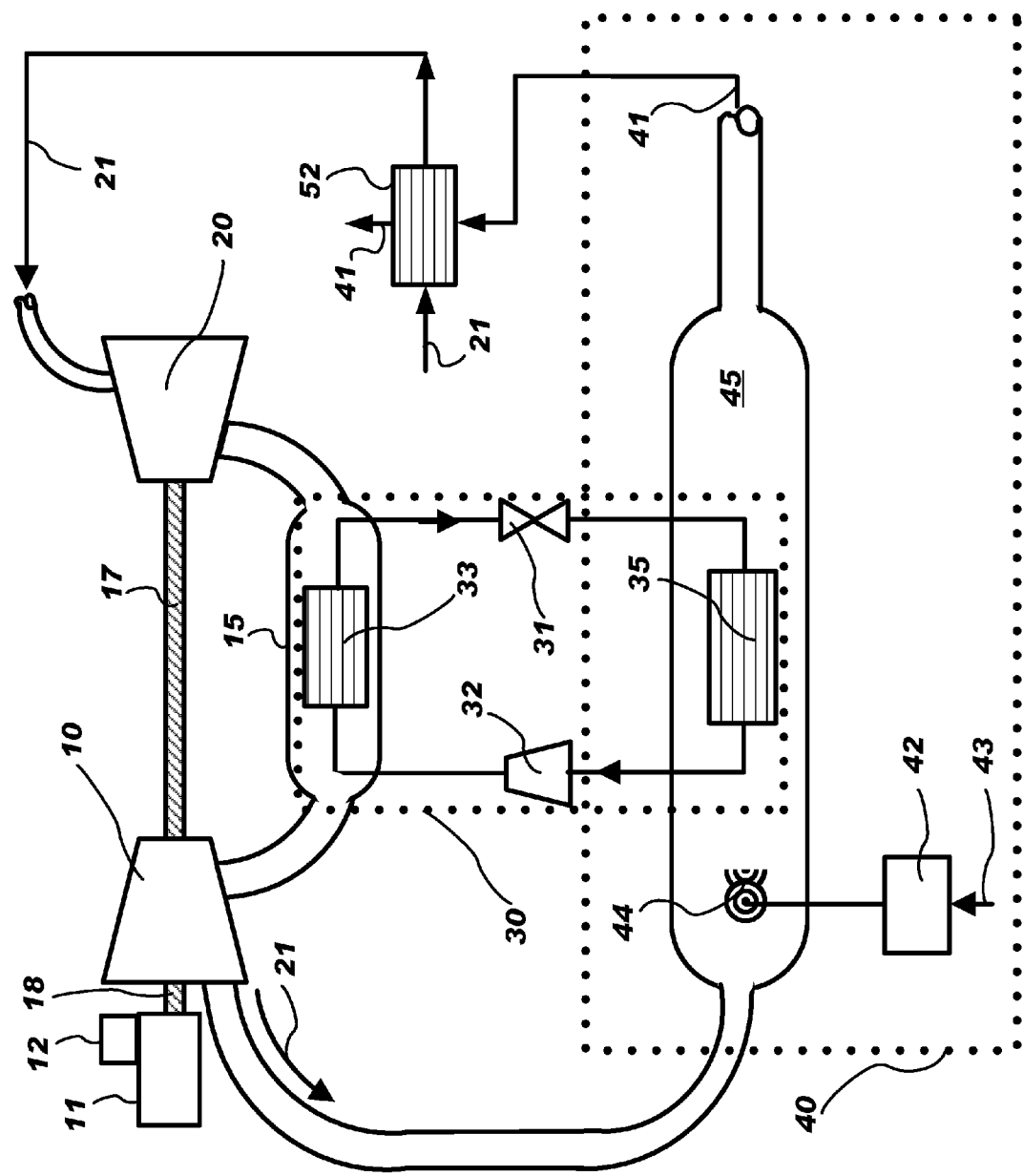

HIGH EFFICIENCY FLEXFUEL INTERNAL COMBUSTION ENGINE

FIELD OF INVENTION

In the field of heat engines, an internal combustion engine and method for the conversion of heated and pressured air as a motive fluid into mechanical motion using an open Brayton cycle, a closed cycle heat pump and a combustion source isolated from the motive fluid and operative at the evaporator coil of the heat pump.

BACKGROUND OF THE INVENTION

A Brayton cycle typically describes the process for gas turbine engine. Ambient air is drawn into the compressor, where it is pressurized in a theoretically isentropic process. The compressed air then runs through a combustion chamber, where fuel is burned, heating that air usually in a constant-pressure process, since the chamber is open to flow in and out. The heated, pressurized air and combustion products then give up their energy, expanding through a turbine another theoretically isentropic process. Some of the work extracted by the turbine is typically used to drive the compressor.

Many variations of the Brayton cycle for turbines are in use and have been described in the prior art. Typically, these embodiments work best with a constant temperature maintained in the motive fluid at the turbine inlet. This is the principle reason that most applications of Brayton cycle engines involve the production of electricity and are not recommended for motive power for a vehicle. One of the methods of the present invention is controlling the power output of the heat engine and thus enhancing a vehicle transportation application, by regulating the temperature of the motive fluid.

None of the prior art describes the indirect addition of heat to compressed air as a motive fluid in an open Brayton cycle that does not employ combustion products as part of the motive fluid. Further, none discloses the addition of heat to the compressed motive fluid solely by operation of a closed-cycle heat pump where the evaporation side of the heat pump is heated by a combustion source. None, thus enables flexfuel capability, that is, flexibility in fuel utilization through an isolated combustion source; high efficiency due to high heat transference to the motive fluid; simplicity due to the use of atmospheric air as the motive fluid, and prolonged turbine life by exposing the turbine blades only to a clean air motive fluid, rather than depleted air and combustion products.

Typical of the prior art, internal combustion efficiencies are not being directly addressed, except by making incremental improvements to engine and vehicle designs. No current internal combustion engine research is devoted to a radical departure from the basic operation of such an engine, as is the case with the present invention.

DESCRIPTION OF THE PRIOR ART

The combination of a Brayton closed-cycle turbine and a heat pump is known in the prior art. A first example of such prior art employs two closed Brayton cycle systems, one operating as a turbine and the other operating as a heat pump in a system for electricity production. This is U.S. Pat. No. 5,537,823 to R. H. Vogel on Jul. 23, 1996 for a high efficiency energy heat engine. Vogel's disclosure is different from the present invention in four key respects: (1) the kind of heat pump used in the present invention uses a two-phase working fluid having a low-temperature evaporation side and a high-temperature condensation side: it is not another Brayton closed-cycle turbine; (2) the present invention uses a Brayton open-cycle turbine: not two closed-cycle turbines, which offers particular benefits in the utilization of readily available atmospheric air as the source of the motive fluid; (3) the present invention heats the low temperature evaporator coil of the heat pump with a combustion source that is isolated from the motive fluid; which adds fuel flexibility not present in the prior art; and, (4) the present invention is of a size that is also compatible with vehicle propulsion, while the prior art is for stationary electricity production.

A second example of such prior art is U.S. Pat. No. 4,424,667 A. E. Fanning on Jan. 10, 1984 for a heat engine using a gas turbine engine, a heat pump and a pair of heat exchangers. However, the Fanning patent teaches, as in many other prior art patents, that the products of combustion are directed through the turbine. The present invention avoids sending the products of combustion through the turbine and thus eliminates the potential for chemical deterioration of the turbine blades by those products of combustion. In the present invention, the combustion source is isolated from the compressed air motive fluid, which is distinctly different from that taught in Fanning and much of the prior art.

Fanning further teaches a heat pump for heating compressed air prior to its combustion in the combustion section. The heat pump extracts heat from the environment. This application for a heat pump is consistent with the more limited and traditional potential for heat pumps. The present invention multiplies heating potential for the heat pump to a level that makes combustion of fuel with the compressed air unnecessary. Sufficient heating of the motive fluid by the heat pump is obtained in the present invention by using a combustion source operating on the cold side of the heat pump. An isolated combustion chamber adds significant flexibility as to the fuels that may be combusted to add energy to the system. It also permits direct use of the turbine exhaust air as input to the combustion chamber, which significantly increases cycle efficiency by maximizing recovering energy from the turbine exhaust.

BRIEF SUMMARY OF THE INVENTION

A heat engine includes a compressor, turbine, heat pump and combustion source and uses heated and compressed air as a motive fluid in an open Brayton cycle. In the process of the invention, the compressor pressurizes air from the environment. A closed-cycle heat pump, having a high-temperature condensation side and a low-temperature evaporation side, increases the energy in the compressed air through heat exchange with the high-temperature condensation side of the heat pump. Upon heating in a constant pressure process, the motive fluid is expanded through the turbine. The combustion source, which is isolated from the motive fluid, further heats the low-temperature evaporation side of the heat pump.

BRIEF DESCRIPTION OF THE DRAWING

The drawing is a diagram of the preferred embodiment of the heat engine.

DETAILED DESCRIPTION

The invention is a heat engine employing a compressor, turbine, heat pump and combustion source and uses heated and compressed air as a motive fluid in the turbine. The turbine process would typically be described as an open Brayton cycle.

The drawing shows the preferred embodiment of the heat engine. The compressor (20) draws in air (21) from the environment and compresses the air (21), which is the motive fluid for expansion through the turbine (10). Typically, the turbine and compressor are on a common shaft (17) forming a compressor/turbine assembly, but may be on separate shafts.

The heat pump (30), is represented by the dotted rectangle in the drawing. The heat pump (30) employs a closed cycle to heat the motive fluid in a compartment (15) prior to expansion in the turbine (10). The heat pump (30) has a low-temperature evaporation side (35) to extract heat from a combustion source (40) and a high-temperature condensation side (33) to add heat to the motive fluid. Typical of such heat pumps, a compressor (32), internal to the heat pump draws in refrigerant gas from the outlet of the low-temperature evaporation side and discharges a high pressure liquid to the high-temperature condensation side (33) to transfer heat from the liquid to a medium outside the heat pump, in this case the colder compressed air within the compartment (15). A check valve (31) prevents reverse flow in the heat pump system. Upon expansion at the intake of the evaporation side, a cold vapor operates on the low-temperature evaporation side (35) to gain heat, in this case from the combustion source (40).

The heat pump is a means to deliver high thermal efficiency in the operation of the engine. The preferred embodiment uses a high capacity heat pump that is capable of transferring more energy per unit time, for example, more British Thermal Units per second, from the combustion source (40) than can be generated by the combustion source (40). This ensures that heat within the combustion chamber (45) is maximally employed in heating the evaporation side (35) of the heat pump.

Heat within the combustion chamber (45) is a combination of the latent heat from the air supply and the sensible heat generated from combusting the fuel (43). Heat is transferred by the heat pump (30) to the motive fluid in a continuous cycle, even if all of the heat produced is not consumed to do useful work. When an excess of heat is produced, the flow rate of the fuel is reduced, until the excess heat is consumed by the continuous cycle, which contributes to a high thermal efficiency for the heat engine.

The turbine (10) expands the motive fluid in an open Brayton cycle. The turbine exhaust is air (21) at a lower temperature and pressure than the air prior to its expansion in the turbine. The air (21) exhausted from the turbine (10) is typically at a temperature higher than ambient air in the environment. The turbine exhaust air (21) may be discharged into the atmosphere or used as the oxygen supply for the combustion source (40). Since it is at a higher temperature than ambient air, porting the turbine exhaust air (21) to the combustion source increases the thermal efficiency of the combustion source (40).

The combustion source (40) heats the low-temperature evaporation side (35) of the heat pump (30). Because no compression takes place at the point of combustion, the engine can operate on any manner of liquid or gaseous fuel available. If built on a much larger scale, the heat engine can use solid fuels such as coal, wood, or low-grade petroleum-based fuels. The combustion source (40) typically has a fuel supply (43), such as natural gas, propane, hydrogen, oil, gasoline, ethanol, or other hydrocarbon; a flame controller (42) and a burner assembly (44) to deliver heat to the low-temperature evaporation side of the heat pump in a chamber (45). The combustion source exhaust (41), cooled by the heat pump (30) is typically at a temperature substantially lower than the ambient air temperature, which evidences that operation of the heat engine consumes the heat of combustion as well as some of the latent heat of the ambient air in the production of useful work.

An embodiment of the invention takes the cold combustion source exhaust (41) and ports it to a heat exchanger (52) for the air (21) entering the compressor (20). This cools the air (21) prior to compression and improves the efficiency of the compressor (20).

The method of using the heat engine includes the steps of compressing air with the compressor to use air as a motive fluid for the turbine; heating the compressed air with the high-temperature condensation side of the heat pump; generating heat by burning fuel in the combustion source to heat the low-temperature side of the heat pump; and, expanding the motive fluid through the turbine to produce useful work.

The combustion source (40) typically generates temperatures at the low-temperature evaporation side (35) of the heat pump, which are in a range of 800 to 1500 degrees Centigrade. For the preferred operation of the heat engine, the heat pump (30) will operate with a small temperature difference between the low-temperature evaporation side (35) and the high-temperature condensation side (33) of the heat pump. This temperature difference is preferably in a range of a few degrees Centigrade up to about ten degrees Centigrade.

In the preferred embodiment of the method of the invention, the turbine exhaust air (21) is used as a source of oxygen in the combustion source (40). In other embodiments, the turbine exhaust air (21) is simply discharged to the atmosphere.

To improve the efficiency of the compressor, some embodiments of the method of the invention include the step of porting the cold combustion source exhaust (41) to a heat exchanger to cool the air entering the compressor (20).

In order to provide a heat engine with the capability to respond to changing vehicle power demands, the method of the invention permits operation at variable turbine inlet temperatures. Additionally, mechanical power is recovered by connecting a transmission (11) to the turbine shaft (18), allowing the high-velocity, low-torque power of the turbine shaft (18) to be matched to the power demands of the load. In the preferred embodiment, the transmission (11) is a variable transmission using an infinitely variable gear ratio.

The method of the invention may also include a step of controlling turbine shaft speed of rotation by regulating the temperature at the high-temperature condensation side of the heat pump through manipulation of the rate of consumption of fuel at the combustion source. The temperature of the motive fluid is directly related to the energy that can be transferred to the turbine. An increase in temperature of the motive fluid translates to an increase in the energy transferred to the turbine and in the resulting turbine shaft speed. Correspondingly, a decrease in temperature of the motive fluid translates to a decrease in the energy transferred to the turbine and in the resulting turbine shaft speed.

The method of the invention may also include a step of controlling turbine shaft speed of rotation by regulating the temperature at the high-temperature condensation side of the heat pump through manipulation of the speed of the heat pump compressor. The speed of the heat pump compressor directly affects the rate of flow of the heat pump working fluid through the heat pump. This rate of flow in turn directly affects the rate of heat transfer from combustion source to motive fluid, and thus the temperature of the motive fluid.

The above method describes the steady state operation of the heat engine. A preferred startup method begins by activating the heat pump. This lowers the temperature of the evaporator coil to the boiling point of the refrigerant, which is preferably sub-zero degrees Centigrade. This also raises the temperature of the condenser coil located in the compartment (15) between the compressor (20) and the turbine (10).

Heat is generated by burning fuel in the combustion source chamber (45). Heat is "pumped" from the combustion source chamber (45) to the compartment (15) via the heat pump (30).

Once the heat pump (30) has reached its operating temperature, the turbine shaft (17) is spun up to operating speed using an electric starter motor 12 that doubles as a generator and drive motor during normal operation. Upon reaching a nominal operating shaft velocity range, heat from the high-temperature condensation side (33) of the heat pump causes compressed air delivered by the compressor (20) to expand rapidly and do work against turbine blades turning the shaft (17). The turning shaft (17) causes the compressor (20) to draw in more air, and, thus, allow the startup stage of the process to reach a point of stable equilibrium.

The foregoing disclosure has been set forth merely to illustrate the invention and is not intended to be limiting. The order of the process steps described are preferred, but may be performed in any order that results in extracting useful work from the turbine. Modifications of the disclosed embodiments incorporating the spirit and substance of the invention may occur to persons skilled in the art. Therefore, the scope of the invention should be determined by the appended claims and their legal equivalents, rather than by the examples given.

What is claimed is:

1. A heat engine comprising,
   (a) a compressor to compress air as a motive fluid for expansion in a turbine;
   (b) a heat pump employing a closed cycle to heat the motive fluid prior to expansion in a turbine wherein the heat pump has a low temperature evaporation side to extract heat from a combustion source and a high-temperature condensation side to add heat to the motive fluid;
   (c) a turbine that expands the motive fluid in an open Brayton cycle; and,
   (d) a combustion source operating on the low-temperature evaporation side of the heat pump.

2. The heat engine of claim 1 wherein the compressor and turbine are on a single shaft and operate as an assembly.

3. The heat engine of claim 1 wherein air exiting from the turbine is ported to an intake for the combustion source.

4. The heat engine of claim 1 further comprising a heat exchanger at an air intake to the compressor to cool the air prior to compression using exhaust from the combustion source.

5. The heat engine of claim 1 further comprising a variable transmission using an infinitely variable gear ratio.

6. The heat engine of claim 1 further comprising an electric starter motor connected to the turbine shaft.

7. A method of using a heat engine comprising the steps of,
   providing a heat engine comprising a compressor; a heat pump employing a closed cycle to heat the motive fluid prior to expansion in a turbine wherein the heat pump has a low temperature evaporation side to extract heat from a combustion source and a high-temperature condensation side to add heat to the motive fluid; a turbine that expands the motive fluid in an open Brayton cycle; and a combustion source operating on the low-temperature evaporation side of the heat pump; compressing air with the compressor to use as a motive fluid;
   heating the compressed air with the high-temperature condensation side of the heat pump;
   generating heat by burning fuel in the combustion source to heat the low-temperature side of the heat pump; and,
   expanding the motive fluid through the turbine to produce useful work.

8. The method of claim 7 wherein the combustion source generates temperatures in a range of 800 to 1500 degrees Centigrade.

9. The method of claim 7 wherein the low temperature evaporation side of the heat pump and the high temperature condensation side of the heat pump have a temperature difference up to about ten degrees Centigrade.

10. The method of claim 7 further comprising the step of using the expanded motive fluid upon exit from the turbine as a source of oxygen in the combustion source.

11. The method of claim 7 further comprising the step of using gases exiting the combustion source to cool the intake air at the compressor.

12. The method of claim 7 further comprising the step of controlling turbine shaft speed of rotation by regulating the temperature at the high-temperature condensation side of the heat pump through manipulation of the rate of consumption of fuel at the combustion source.

13. The method of claim 7 further comprising the step of controlling turbine shaft speed of rotation by regulating the temperature at the high-temperature condensation side of the heat pump through manipulation of the speed of the heat pump compressor.

* * * * *